United States Patent
Govindarajan et al.

(10) Patent No.: US 10,134,032 B2
(45) Date of Patent: Nov. 20, 2018

(54) WIRELESS BEACON COMMUNICATIONS THROUGH MAGNETIC CARD READERS

(71) Applicant: PAYPAL, INC., San Jose, CA (US)

(72) Inventors: Satish Govindarajan, San Jose, CA (US); Geoffrey W. Chatterton, Los Altos, CA (US)

(73) Assignee: PAYPAL, INC., San Jose, CA (US)

( * ) Notice: Subject to any disclaimer, the term of this patent is extended or adjusted under 35 U.S.C. 154(b) by 846 days.

(21) Appl. No.: 14/586,906

(22) Filed: Dec. 30, 2014

(65) Prior Publication Data

US 2015/0186874 A1   Jul. 2, 2015

Related U.S. Application Data

(60) Provisional application No. 61/922,682, filed on Dec. 31, 2013.

(51) Int. Cl.
| | |
|---|---|
| *G06Q 20/00* | (2012.01) |
| *G06Q 20/38* | (2012.01) |
| *G06Q 20/32* | (2012.01) |
| *G06Q 20/34* | (2012.01) |
| *G06Q 20/20* | (2012.01) |
| *G07F 7/08* | (2006.01) |

(52) U.S. Cl.
CPC ........... *G06Q 20/382* (2013.01); *G06Q 20/20* (2013.01); *G06Q 20/322* (2013.01); *G06Q 20/325* (2013.01); *G06Q 20/34* (2013.01); *G07F 7/088* (2013.01)

(58) Field of Classification Search
CPC ....................................................... G06Q 30/00
See application file for complete search history.

(56) References Cited

U.S. PATENT DOCUMENTS

| | | | |
|---|---|---|---|
| 8,498,900 | B1 | 7/2013 | Spirin et al. |
| 9,195,984 | B1 * | 11/2015 | Spector ............... G06Q 20/367 |
| 2004/0087339 | A1 | 5/2004 | Goldthwaite et al. |
| 2007/0022058 | A1 | 1/2007 | Labrou et al. |
| 2009/0108061 | A1 | 4/2009 | Tartavull et al. |
| 2013/0124346 | A1 * | 5/2013 | Baldwin .............. G06Q 20/322 |
| | | | 705/16 |

* cited by examiner

*Primary Examiner* — John W Hayes
*Assistant Examiner* — John Winter
(74) *Attorney, Agent, or Firm* — Haynes and Boone, LLP

(57) ABSTRACT

There are provided systems and method for wireless beacon communications through magnetic card readers. A check-in at a merchant location may be completed using a beacon at the merchant location with a communication device. When a user wishes to pay for an item, the beacon may alert the user through their communication device that payment may be effectuated through the communication device. The communication device may communicate a payment token to the wireless beacon that identifies payment information for the user using a payment provider. The payment token may be encrypted, and the wireless beacon may decrypted the payment token prior to transmission to an accessory of a point of sale device, such as a magnetic card reader using magnetic field generation. This payment token may then be transmitted to a point of sale device, which may utilize a payment provider and/or a payment card issuer to effectuate payment.

20 Claims, 5 Drawing Sheets

WIRELESS BEACON COMMUNICATIONS THROUGH MAGNETIC CARD READERS

CROSS REFERENCE TO RELATED APPLICATION

This application claims prior to U.S. Provisional Patent Application No. 61/922,682, filed Dec. 31, 2013, the contents of which are incorporated by reference herein in their entirety.

TECHNICAL FIELD

The present application generally relates to wireless beacon communications through magnetic card readers and more specifically to effectuating a payment to a merchant system using a payment token communicated to a merchant point of sale device through magnetic field generation.

BACKGROUND

Consumers may visit retail locations, such as shopping malls, strip malls, large department stores, or other locations having merchants with products and/or services available for purchase. Traditionally, consumers utilized cash, check, or payments cards (e.g., credit/debit cards) to complete payment for the items. These payment methods required the consumer to carry the payment instrument on them, which risked potential theft and/or fraud. Presently, in order to limit exposure to these risks, consumers have opted to utilize payment cards due to fraud protection services afforded by the card issuers. Thus, many merchants include magnetic card readers and other point of sale devices that may be utilized to verify the existence and funds available for the payment card. While some merchants offer payments using through check-in and online payment services, a payment provider, and a communication device in possession of the user at the merchant's location, infrastructure required to complete these payments has prevented the technology from becoming widespread.

Figure 1:
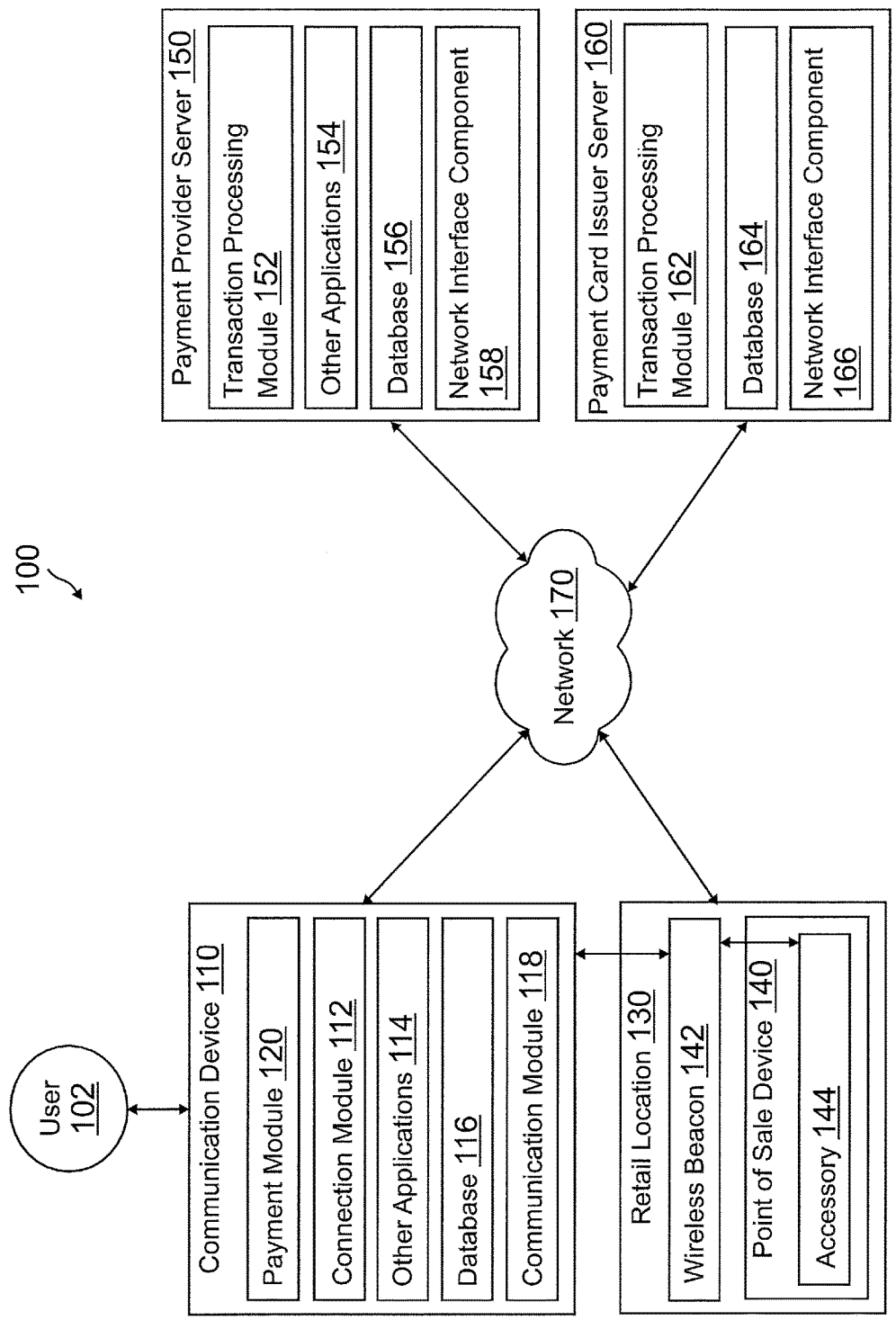
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods that provide for wireless beacon communications through magnetic card readers. Systems suitable for practicing methods of the present disclosure are also provided.

Various merchants at retail locations may utilize short range wireless communication with a communication device to provide services to users, such as Bluetooth, Bluetooth Low Energy, and/or LTE Direct beacon communications. These beacons may be set up at a merchant stores and communicate with the users' communication devices to alert the user of check-in services, discounts at the merchant, or available merchandise from the merchant. The user may be notified as soon as they are in proximity to the beacon through their communication device. The beacons may also be utilized to communicate information from the communication device to the merchant and/or merchant server.

Thus, a retail location for a merchant, such as a retail storefront, may offer check-in services to a user. The check-in services may be completed over a network connection between a communication device and a device for the merchant, or using short range wireless beacons connected to the device and in communication with the user's communication device through short range wireless communication, such as Bluetooth Low Energy (BLE). In various embodiments, once the communication device is connected to the beacon, e.g., through a check-in or based on a connection to the beacon, the beacon/point of sale device may transmit a payment request to the communication device that may include an amount payable by the user to the merchant (e.g., for items/services offered for sale by the merchant and selected by the user). The payment request may include information displayable to the user including a purchase amount for the item(s)/service(s) for purchase by the user. In such embodiments, the user may review the purchase request through a payment application. The user may utilize the payment application to complete the purchase by transmitting payment information for the payment request to the beacon.

The communication device may transmit the payment information back to the beacon as a payment token. The payment token may be generated by a payment provider that offers payment services to the user. The payment token may include an alphanumeric identifier that may associate the user to a particular point of sale station and transaction. For example, when the user first is checked-in at the merchant location, the payment provider may open a tab identified by an alphanumeric code (e.g., #1234). At the time of checkout and payment for a transaction, the communication device may provide the alphanumeric code as a payment token to the point of sale device through the wireless beacon. For example, the wireless beacon may emit magnetic field waves in a short burst that mimic the payment token (e.g., as magnetic field waves that include data corresponding to the payment token). These magnetic field emissions may be picked up by a magnetic card reader or other accessory using standard card reading technology. Thus, the magnetic card reader may experience a "card swipe" by receiving the magnetic field emissions. The accessory may then transmit the payment token to the point of sale device for processing (e.g., through a standard connection between the point of sale device and the accessory).

Thus, the point of sale device receives a payment token corresponding to time-variable mapping between the customer and the merchant that identifies a payment request for a transaction with the merchant and the customer to a particular point of sale device. In various embodiments, the payment token may be a having a 4-10 digit number, a 15-16 digit number that emulates a credit card, or any other numeric or alphanumeric code. Once the point of sale device receives the payment token, the point of sale device may send the payment token to a server, such as a payment provider, for processing. The server may determine the payment information for the payment request using the payment token. This may optionally include requesting identification of a payment instrument by the user as well as verification of the payment total for the transaction. Once the payment information is determined, the server may process the payment information with the point of sale device. In various embodiments, this may include transmitting the payment information to the point of sale device for completion of the payment request with a payment card issuer server (e.g., where the payment information includes a payment card as the payment instrument). In other embodiments, the server may determine a payment account for the payment information and complete the payment request using the payment account. In such embodiments, the payment provider may provide payment through the payment account or may generate a one-time use payment card that includes payment for the payment request to the merchant. The point of sale device may receive the one-time use payment card number and utilize a payment card issuer to receive payment.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a communication device 110, a retail location 130 with a point of sale device 140, a payment provider server 150, and a payment card issuer server 160 in communication over a network 170. User 102, such as a consumer, may utilize communication device 110 to check-in to point of sale device 140. When user 102 attempts to pay for an item, point of sale device 140 and/or a wireless beacon 142 may transmit a payment request to communication device 110 for the transaction for the item. Communication device 110 may a payment token to wireless beacon 142. The payment token may include an alphanumeric number that associates user 102 with point of sale device 140 and the transaction initiated with user 102 at retail location 130 and with point of sale device 140. Wireless beacon 142 may communicate the payment token to an accessory 144 for point of sale device 140 using magnetic field generation. The payment token may then be transmitted from point of sale device 140 to payment provider server 150 for processing. Payment may then be processed using the payment information. In various embodiments, where the payment information includes a payment card number, payment card issuer server 160 may be utilized to fulfill the payment for the payment request.

Communication device 110, point of sale device 140, wireless beacon 142, accessory 144, payment provider server 150, and payment card issuer server 160 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 170.

Communication device 110 may be implemented using any appropriate hardware and software configured for wired and/or wireless communication with point of sale device 140, wireless beacon 142, payment provider server 150, and/or payment card issuer server 160. For example, in one embodiment, communication device 110 may be implemented as a personal computer (PC), a smart phone, laptop computer, wristwatch with appropriate computer hardware resources, eyeglasses with appropriate computer hardware (e.g. GOOGLE GLASS®) and/or other types of computing devices capable of transmitting and/or receiving data, such as an IPAD® from APPLE®. Although a communication device is shown, the communication device may be managed or controlled by any suitable processing device. Although only one communication device is shown, a plurality of communication devices may be utilized.

Communication device 110 of FIG. 1 contains a connection module 112, a payment module 120, other applications 114, a database 116, and a communication module 118. Connection module 112, payment module 120, and other applications 114 may correspond to processes, procedures, and/or applications, for example, a software program, executable by a hardware processor. In other embodiments, communication device 110 may include additional or different modules having specialized hardware and/or software as required.

Connection module 112 may correspond to one or more processes to execute modules and associated specialized hardware of communication device 110 to establish a connection with point of sale device 140, such as through wireless beacon 142, and/or check-in to a merchant location associated with point of sale device 140. In this regard, connection module 112 may correspond to specialized hardware and/or software utilized by user 102 to establish a connection between communication device 110 and point of sale device 140. Connection module 112 may correspond to a specific module utilized by communication device 110 with a server for retail location 130 and/or point of sale device 140 to complete a check-in with a merchant location associated with point of sale device 140 (e.g., a shopping mall including the merchant location and/or a specific retail location for the merchant associated with point of sale device 110). The check-in may correspond to a processes to log in to a user account of user 102 with point of sale device 140 or otherwise provide and verify identity of user 102, including transmission of an identifier for a payment account with payment provider server 150. The check-in may be completed over network 170 with point of sale device 140 or a server for point of sale device 140. In such embodiments, connection module 112 may correspond more generally to a browser application/module of communication device 110 configured to communicate with the server. For example, connection module 112 may establish an initial check-in with the server to purchase items from point of sale device 140. Thus, the check-in may be completed prior to communication device 110 connecting to wireless beacon 142.

Connection module 112 may also include an application available over the Internet from a server, including a server corresponding to point of sale device 140. Connection module 112 may be set up to receive short range wireless communications with wireless beacon 142 to complete a check-in process. For example, wireless beacon 142 may communicate with communication device 110 and complete the check-in process with point of sale device 140 directly while user 102 is at or near wireless beacon 142. Wireless beacon 142 may be configured to transmit an identifier for reception by communication device 110, as will be explained in more detail herein.

Connection module 112 may execute in the background of an operating system of communication device 110 and be configured to establish connections, using communication module 118 of communication device 110, with wireless beacon 142. The connection may be established with or without user input from user 102. For example, wireless beacon 142 may broadcast a token, including a universally unique identifier (UUID), for reception by connection module 112, as will be explained in more detail herein. Connection module 112 may utilize communication module 118 of communication device 110 to receive the token from wireless beacon 142. If connection module 112 acknowledges the UUID as identifying wireless beacon 142 and/or merchant/service 130, connection module 112 may transmit an identifier corresponding to user 102 and/or communication device 110 back to wireless beacon 142. Connection module 112 may utilize communication module 118 of communication device 110 to communicate with wireless beacon 142 (e.g., over near field communication, Bluetooth, Bluetooth Low Energy, LTE Direct, radio, infrared, or other communication protocol). The identifier from communication device 110 may include, be transmitted with, concatenated with, or otherwise bundled with the identifier received from wireless beacon 142. Identifiers may be transmitted as an encrypted token using public/private key(s) of communication device 110, wireless beacon 142, and/or point of sale device 140. Additionally, tokens may include a received identifier from the intended recipient of the token in addition to the transmitted identifier in order to identify the token's intended recipient.

Once connection module 112 has completed a connection with point of sale device 140 (i.e., over network 170 or through wireless beacon 142), communication device 110 may be checked-in with retail location 130 and/or point of sale device 140 if user 102 has not previously been checked-in. The check-in process may then associate user 102 with wireless beacon 142 used to check-in user 102. The check-in process may also cause payment provider server 150 to open a tab or otherwise generate a payment token for user with point of sale device 140 to process a payment for a transaction after receiving a payment request and the payment token. Connection module 112 may receive additional information from point of sale device 140. The additional information may correspond to a bill/purchase request for one or more items/services available from the merchant corresponding to point of sale device 140. Payment module 120 may then populate payment information for a transaction transmitted to communication device 110 from wireless beacon 142. For example, payment module 120 may populate a purchase request received from wireless beacon 142, or may include a list of items/services available with the merchant and/or selected for purchase by user 102. Thus, user 102 may view the purchase request having selected items/services or may select items/services to generate a purchase request. Once user 102 has approved a purchase request and selected payment information to complete the transaction, payment module 120 may be utilized to retrieve a payment token for communication to wireless beacon 142, as will be explained in more detail herein.

Thus, connection module 112 may transmit the payment token to wireless beacon 142 for transmission to accessory 144, and then point of sale device 140, as will be explained in more detail herein. In certain embodiments, connection module 112 of communication device 110 may utilize short range wireless communication of communication device 110 with wireless beacon 142, such as near field communication, Bluetooth, Bluetooth Low Energy, LTE Direct, radio, infrared, or other communication protocol. Connection module 112 and/or payment module 120 may encrypt the payment token prior to transmission to wireless beacon 142 using an encryption format corresponding to payment provider server 150. In other embodiments, payment provider server 150 may encrypt the payment token and communicate the payment token to communication device 110 for transmission to point of sale device 140 through accessory 144. In such embodiments, payment module 120 may utilize a connection to network 170 or wireless beacon 142 to request the payment token from payment provider server 150. Encryption of the payment token may be done to prevent unauthorized reception and use of the payment token by other devices in proximity to and/or connected with wireless beacon 142.

Payment module 120 may correspond to one or more processes to execute modules and associated specialized hardware of communication device 110 to provide payment tokens to point of sale device 140 for use in processing and completing a payment to the merchant associated with point of sale device 140. In this regard, payment module 120 may correspond to specialized hardware and/or software utilized to provide a convenient interface to permit user 102 to select payment options and provide payment for items and/or services to point of sale device 140. In some embodiments, payment module 120 may correspond more generally to a web browser configured to view information available over the Internet or access a website corresponding to a payment service provider (e.g., payment provider server 150 and/or payment card issuer server 160). In various embodiments, payment module 120 may provide for management of a user account with payment provider, such as payment provider server 150. The payment account may be utilized by payment provider server 150 during processing of payment for a payment request for a transaction with point of sale device 140.

Once user 102 has checked-in with point of sale device 140, communication device 110 may establish a connection with point of sale device 140 through wireless beacon 142 and receive payment requests and/or other transaction information, as discussed herein. Thus, payment module 120 may populate the payment request. For example, payment module 120 may be used to generate a purchase request from displayable items, or may include the purchase request received from wireless beacon 142. Payment module 120 may be utilized to facilitate creation of a payment token for point of sale device 140. The payment token may also include code (e.g., numeric or alphanumeric) that corresponds to a time-variable mapping between user 102 and the merchant, allowing payment provider server 150 to identify both the payment request (e.g., the tab for a transaction) and user 102. The payment token may be generated by payment provider server 150 on request by payment module 120. In various embodiments, the payment token may be generated prior to receipt of the payment request, such as when user 102 is checked-in with retail location 130 and/or point of sale device 140. The payment token may also be generated at the time of checkout for a transaction. Thus, payment provider server 150 may provide payment for the payment request to communication device 110 as a payment token. Once the payment token is generated, the token may be encrypted and transmitted to wireless beacon 142, as discussed herein.

In various embodiments, one or more features of connection module 112 and/or payment module 120 may be incorporated in the same module so as to provide their respective features in one module.

Communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over network 170, or other types of applications. Other applications 114 may also include email, texting, voice and IM applications that allow a user to send and receive emails, calls, texts, and other notifications through network 170. Other applications 114 may contain software programs, executable by a processor, including a graphical user interface (GUI) configured to provide an interface to the user.

Communication device 110 may further include database 116 which may include, for example, identifiers such as operating system registry entries, cookies associated with connection module 112, payment module 120, and/or other applications 114, identifiers associated with hardware of communication device 110, or other appropriate identifiers, such as identifiers used for payment/user/device authentication or identification. Database 116 may include communication device tokens and/or encryption keys, including a public key of point of sale device 140, wireless beacon 142, and/or payment provider server 150, as well as private keys for communication device 110. Database 116 may include identifying information for tokens enabling connection module 112 to identify point of sale device 140 and/or wireless beacon 142 when receiving a corresponding connection/check-in token. In one embodiment, identifiers in database 116 may be used by a payment/credit provider, such as payment provider server 150, to associate communication device 110 with a particular account maintained by the payment/credit provider. Database 116 may further include payment card information, including credit, debit, and/or gift card information. In various embodiments, database 116 may include information to access an online account, including a payment account with payment provider server 150. Database 116 may further stored received payment tokens from payment provider server 150.

Communication device 110 includes at least one communication module 118 adapted to communicate with point of sale device 140, wireless beacon 142, payment provider server 150, and/or payment card issuer server 160. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with wireless beacon 142 without network 170 using short range communications, such as Bluetooth Low Energy, LTE Direct, radio frequency, infrared, Bluetooth, and near field communications.

Retail location 130 may correspond to a physical retail location including a merchant and/or service location. Retail location 130 may correspond to merchants/services at shopping mall, strip malls, airports, train stations, event venues, hotel venues, casino venues, or other location where a merchant/service may be offered. Retail location 130 may be one of a plurality of retail locations corresponding to a retail location server. However, in other embodiments, retail location 130 may correspond only to point of sale device 140 (e.g., a retail storefront for the merchant associated with point of sale device 140).

Retail location 130 includes a point of sale device 140, which may correspond to a merchant or service offered at retail location 130. Point of sale device 140 may be located at a physical location in retail location 130. Additionally, retail location 130 may include other features not pictured in FIG. 1, such as additional wireless beacons for communicating with communication device 110 and establishing an initial connection point of sale device 140, network connections to network 170, and other merchants and services.

Point of sale device 140 may be maintained, for example, by a merchant or seller offering various items, products, and/or services through a merchant location. Generally, point of sale device 140 may be maintained by anyone or any entity that receives money, which includes charities as well as retailers and restaurants. In other embodiments, point of sale device 140 may be maintained by an entity offering services to user 102, such as travel services, hotel/concierge services, food/restaurant services, or the like. In this regard, point of sale device 140 may include a device having processing applications, which may be configured to interact with communication device 110, payment provider server 150, and/or payment card issuer server 160 to facilitate the sale of items and/or process payment tokens for the items. Additionally, point of sale device 140 corresponds to an entity providing wireless beacon 142 for processing a check-in and payment token exchange with communication device 110.

Point of sale device 140 may be implemented using any appropriate hardware and software configured for wired and/or wireless communication with communication device 110, payment provider server 150, and/or payment card issuer server 160. For example, in one embodiment, point of sale device 140 may be implemented as a single or networked personal computer (PC), a smart phone, personal digital assistant (PDA), laptop computer, wearable computing device, and/or other types of computing devices at a merchant location capable of transmitting and/or receiving data. Although a point of sale device is shown, the point of sale device may be managed or controlled by any suitable processing device. Although only one point of sale device is shown, a plurality of point of sale devices may be utilized.

Point of sale device 140 may correspond to a device enabling the merchant associated with point of sale device 140 to complete financial transactions, as well as create and/or transmit advertisements for display by communication device 110. Point of sale device 140 may further utilize wireless beacon 142 to determine is user 102 is in proximity to point of sale device 140 and transmit payment requests/ item information to communication device 110 for a transaction. Point of sale device 140 may further include check-in applications configured to interact with connection module 112 of communication device 110 to complete a check-in of user 102 with point of sale device 140. Check-in may be done as soon as user 102 checks-in with a server for point of sale device 140 or when user 102 is in proximity to point of sale device 140 and connects to wireless beacon 142, as discussed herein.

Point of sale device 140 may include check-out and/or payment applications which may be configured to complete transactions for items. Transactions may be completed using payment provider server 150. Point of sale device 140 may receive a payment token from accessory 144. The payment token may be encrypted prior to transmission to accessory 144, as discussed herein. Additionally, wireless beacon 142 may decrypt the encrypted payment token prior to transmission to accessory 144 and then point of sale device 140. For example, accessory 144 may correspond to a magnetic card reader. When the magnetic card reader normally scans a magnetic data strip on a payment card, the magnetic card reader may utilize the first 4 numbers and the last 4 numbers as clear text for use in identifying payment card issuer server 160 and receipt printing. Thus, point of sale device 140 may utilize the first 4 numbers to select the card issuer processing pathway, and request payment approval from payment card issuer server 160.

However, when accessory 144 receives the payment token, accessory 144 may provide the payment token to point of sale device 140 as an alphanumeric code allowing point of sale device 140 to select payment provider server 150 for processing of the payment token. Therefore, point of sale device 140 may not require changes to existing infrastructure using magnetic card readers when utilizing wireless beacon 142 to effectuate a payment. Thus, accessory 144 may transmit the payment token to point of sale device 140. Point of sale device 140 may transmit the payment token to payment provider server 150 to receive payment, such as through a payment card, payment through a payment account, and/or a one-time use payment card number associated with the payment account.

Payment may then be processed using the payment information. Payment provider server 150 may transmit the payment information back to point of sale device 140 where the information corresponds to payment card clear text (e.g., a payment card with payment card issuer server 160). Thus, point of sale device 140 may utilize the first 4 numbers to select the card issuer processing pathway, and request payment approval from payment card issuer server 160 using the payment card information. However, in other embodiments, the payment information may correspond to a payment account with payment provider server 150 and payment may be issued to point of sale device 140 using the payment account information with the payment request.

Thus, point of sale device 140 is associated with wireless beacon 142 and accessory 144. Wireless beacon 142 may be maintained, for example, by the merchant associated with point of sale device 140. Wireless beacon 142 may be implemented using any appropriate hardware and software configured for wireless communication with communication device 110. For example, in one embodiment, wireless beacon 142 may be implemented as a dongle device including a hardware processor and a communication module, for example, connected to point of sale device 140. Wireless beacon 142 may also be implemented as a device incorporated within a personal computer (PC), a smart phone, personal digital assistant (PDA), laptop computer, wearable computing device, and/or other types of computing devices capable of transmitting and/or receiving data, such as an IPAD® from APPLE®. Although a single wireless beacon is shown, a plurality of wireless beacons may be utilized.

Wireless beacon 142 of FIG. 1 contains processes, procedures, and/or applications executable by a hardware processor, for example, a software program, configured to interact with communication device 110. Wireless beacon 142 may include applications for transmitting requests to establish a connection between a communication device and a merchant. Thus, wireless beacon 142 may utilize a short range wireless communication of wireless beacon 142 to transmit requests to establish a connection with communication device 110, including an identifier such as a Universal Unique Identifier (UUID). If communication device 110 receives the request to establish the connection and responds with a communication device identifier (potentially including the UUID and other information to effectuate a check-in of communication device 110), wireless beacon 142 may ramp up in power and create a connection between communication device 110 and wireless beacon 142.

Wireless beacon 142 may transmit the request to establish the connection with wireless beacon 142 as a short range communication (e.g. a BLE protocol communication) including a "wake up" process for connection module 112 of communication device 110 and/or a token for wireless beacon 142 or point of sale device 140. In other embodiments, the request and/or connection may utilize near field communication, radio communication, infrared communication, or Bluetooth communication. Additionally, although wireless beacon 142 may utilize BLE protocol communications to effectuate an "always on" type service where the UUID and "wake up" process are transmitted continuously by wireless beacon 142, other communication protocols used to provide an "always on" service may include QUALCOMM® LTE Direct or similar device-to-device communication technology. BLE and LTE Direct may both be utilized to provide discovery of nearby devices to wireless beacon 142 and establishment of a connection.

The request may be specific to communication device 110 by including information that is specific to user 102, such as a name, identifier, or communication device identifier. The information specific to user 102 may be determined from a user account of user 102 or other information previously provided to point of sale device 140 (and/or a server corresponding to point of sale device 140). Thus, in certain embodiments, only communication device 110 will pick up and authenticate the request. After wireless beacon 142 receives a communication device identifier from communication device 110, wireless beacon 142 may determine user 102 is in proximity to point of sale device 140. If check-in with point of sale device 140 has not previously been completed, then point of sale device 140 may complete check in. Wireless beacon 142 may pass the communication device identifier to point of sale device 140 to complete the check-in process.

Additionally, wireless beacon 142 may keep a communication channel open between communication device 110, point of sale device 140, accessory 144, payment provider server 150, and/or payment card issuer server 160 for passing additionally information, such as item, transaction, payment, or identification information. For example, wireless beacon 142 may communicate over BLE with communication device 110. Once communication device 110 transmits a payment token corresponding to payment information for a payment request, wireless beacon 142 may receive the token for transmission to accessory 144. In various embodiments, wireless beacon 142 may be required to decrypt the payment token where the payment token is encrypted prior to transmission to wireless beacon 142. Wireless beacon 142 may transmit a received payment token from communication device 110 to accessory 144. The payment token may be encrypted by communication device 110 or payment provider server 150 may encrypt the payment token when generating the payment token.

Wireless beacon 142 may utilize magnetic field generation to transmit the payment token to accessory 144. Wireless beacon 142 may include an air-core solenoid mounted near enough to the magnetic head of the card reader (e.g., accessory 144) so that the read head of accessory 144 can detect magnetic signals from the air-core solenoid of wireless beacon 142. The air-core solenoid may be driven in such a way as to replicate the varying magnetic field that a regular magnetic stripe card shows to the head of accessory 144 as it is swiped by. However, the solenoid itself may not actually move. For example, accessory 144 may correspond to a magnetic card reader configured to receive payment card data through a magnetic data strip. Thus, using magnetic wave emissions, accessory 144 may receive the payment token without changes to the infrastructure for accessory 144. The magnetic field emissions by wireless beacon 142 may be range limited (e.g., 4 centimeters or less) to prevent unnecessary and/or unauthorized receptions by nearby devices. Accessory 144 may then transmit the payment token to point of sale device 140.

Accessory 144 may be maintained, for example, by a merchant or seller offering payment using magnetic payment cards. Generally, accessory 144 may be maintained by anyone or any entity that receives money, which includes charities as well as retailers and restaurants. Accessory 144 may be implemented using any appropriate hardware and software configured for wired and/or wireless communication with point of sale device 140 and wireless beacon 142. For example, in one embodiment, accessory 144 may be implemented as a magnetic data strip reader, including a magnetic reading head and processing devices for converting magnetic fluctuations to and from electrical signals. Accessory 144 may include and/or be connected to a single or networked personal computer (PC), a smart phone, personal digital assistant (PDA), laptop computer, and/or other types of computing devices at a merchant location capable of transmitting and/or receiving data. Although a single accessory is shown, a plurality of accessories may be utilized.

Payment provider server 150 may be maintained, for example, by an online payment service provider, which may provide payment services and/or processing for financial transactions on behalf of a user with a merchant. In this regard, payment provider server 150 includes one or more processing applications which may be configured to interact with communication device 110, point of sale device 140, and/or payment card issuer server 160 to facilitate payment for a transaction. In one example, payment provider server 150 may be provided by PAYPAL®, Inc. of San Jose, Calif., U.S.A. However, in other embodiments, payment provider server 150 may be maintained by or include a credit provider, financial services provider, financial data provider, and/or other service provider, which may provide payment services to user 102.

Payment provider server 150 of FIG. 1 includes a transaction processing module 152, other applications 154, database 156, and a network interface component 158. Transaction processing module 152 and other applications 154 may correspond to processes, procedures, and/or applications, for example, a software program, executable by a hardware processor. In other embodiments, payment provider server 150 may include additional or different modules having specialized hardware and/or software as required.

Transaction processing module 152 may correspond to one or more processes to execute modules and associated specialized hardware of transaction processing module 152 to receive and/or transmit information from communication device 110, point of sale device 140, and/or payment card issuer server 160 for processing and completion of financial transactions. In this regard, transaction processing module 152 may correspond to specialized hardware and/or software utilized by payment provider server 150 to process financial transaction information from communication device 110 and point of sale device 140 by receiving a payment token. Initially, communication device 110 may transmit a payment token to wireless beacon 142. The payment token may correspond to a payment request for a transaction between user 102 using communication device 110 and point of sale device 140. The payment token may be generated when user 102 checks-in with wireless beacon 142, such as when user 102 enter retail location 130 and/or begins a transaction with point of sale device 140. The payment token may correspond to a number that identifies user 102 and a payment account for user 102. The payment token may be utilized by point of sale device 140 to associate user 102 with point of sale device 140 and a particular transaction engaged by user 102 with point of sale device 140. The payment token may be encrypted by payment provider server 150 prior to transmission to communication device 110 using an encryption algorithm corresponding to wireless beacon 142 and payment provider server 150. Thus, wireless beacon 142 may include encryption keys and/or other encryption information necessary to decrypt the encrypted payment token and communicate the payment token having a numeric or alphanumeric code to accessory 144 using magnetic field modulation. Point of sale device 140 may then transmit the payment token to transaction processing module 152 for processing. In various embodiments, transaction processing module 152 may identify a payment card for use with the payment request for the transaction and respond to point of sale device 140 with clear text of payment card information in order to process the payment request with payment card issuer server 160. In certain embodiments, transaction processing module 152 may request identification of the payment card or other payment instrument by user 102 after receiving the payment token from point of sale device 140. Transaction processing module 152 may also request confirmation of the payment total for the transaction.

However, the payment token may also be associated with payment information such as a user account identifier or other payment information (e.g. a credit/debit card or checking account). Additionally, the payment token may be transmitted by point of sale device 140 with a payment request having payment amount and terms of payment for a transaction. Transaction processing module 152 may complete the sale transaction by providing payment to the merchant associated with point of sale device 140 using the payment account and payment request. Transaction processing module 152 may provide payment to point of sale device 140 and/or a merchant account for the merchant associated with point of sale device 140. In other embodiments, transaction processing module 152 may generate a one-time use payment card number for a payment using the payment account and communicate the one-time use payment card number to point of sale device 140 for processing with a card issuer, such as payment card issuer server 160. Additionally, transaction processing module 152 may provide transaction histories, including receipts, to communication device 110 and/or point of sale device 140 for completion and documentation of the financial transaction.

In various embodiments, payment provider server 150 includes other applications 154 as may be desired in particular embodiments to provide features to payment provider server 150. For example, other applications 154 may include security applications for implementing server-side security features, programmatic server applications for interfacing with appropriate application programming interfaces (APIs) over network 170, or other types of applications. Other applications 154 may contain software programs, executable by a processor, including a graphical user interface (GUI), configured to provide an interface to a user.

Additionally, payment provider server 150 may include database 156. As discussed herein, user 102 may establish one or more user accounts with payment provider server 150. Database 156 may include user information, such as name, address, birthdate, payment/funding information, additional user financial information, and/or other desired user data. User 102 may link database 156 to communication device 110 through a communication device identifier. Thus, when a device identifier corresponding to communication device 110 is transmitted to payment provider server 150, e.g. from communication device 110 and/or point of sale device 140, a user account belonging to user 102 may be found. However, in other embodiments, user 102 may not have previously established a user account. Thus, payment provider server 150 may complete a transaction based on another user financial account received from communication device 110 and/or point of sale device 140. Database 156 may store generated payment tokens with associated information utilized to identify user 102 and/or a payment instrument for user 102. Database 156 may further store encryption keys utilized to decrypt an encrypted payment token and/or for communication to communication device 110, point of sale device 140, and/or wireless beacon 142 for use in encrypting a payment token. Thus, database 156 may include public and/or private keys of an encryption algorithm used by payment provider server 150, such as Advanced Encryption Standard (AES) encryption and Triple DES (TDES) encryption.

In various embodiments, payment provider server 150 includes at least one network interface component (NIC) 158 adapted to communicate with network 170 including communication device 110 and/or point of sale device 140. In various embodiments, network interface component 158 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Payment card issuer server 160 may be maintained, for example, by a payment card issuer, which may provide payment cards, such as credit and debit cards, to users. Payment card issuer server 160 may be maintained by or include a credit provider, financial services provider, financial data provider, and/or other service provider, which may provide payment services to user 102. Thus, payment card issuer server 160 may correspond to a bank, a credit provider, and/or a gift card provider, including a merchant/service server corresponding to point of sale device 140. In this regard, payment card issuer server 160 includes one or more processing applications which may be configured to interact with communication device 110, point of sale device 140, and/or payment provider server 150 to facilitate payment for a transaction.

Payment card issuer server 160 of FIG. 1 includes a transaction processing module 162, database 164, and a network interface component 166. Transaction processing module 162 may correspond to processes, procedures, and/or applications executable by a hardware processor, for example, a software program. In other embodiments, payment provider server 150 may include additional or different software as required.

Transaction processing module 162 may correspond to one or more processes to execute modules and associated specialized hardware of transaction processing module 162 to receive and/or transmit information for processing and completion of financial transactions. In this regard, transaction processing module 152 may correspond to specialized hardware and/or software utilized by payment card issuer server 160 to process financial transaction information from point of sale device 140 by receiving a request to complete a sale transaction for items/services/goods. The request may include a payment card issued by payment card issuer server 160 and an amount to pay the merchant associated with point of sale device 140 using the payment card). Additionally, the payment request may include a payment amount and terms of payment. Transaction processing module 162 may complete the sale transaction by providing payment to point of sale device 140 using the payment card. Additionally, transaction processing module 162 may provide transaction histories, including receipts, to communication device 110 and/or point of sale device 140 for completion and documentation of the financial transaction.

Additionally, payment card issuer server 160 may include database 164. As discussed herein, user 102 may establish one or more payment card accounts with payment card issuer server 160 having payment card number(s). Database 164 may include user information, such as name, address, birthdate, payment/funding information, additional user financial information, and/or other desired user data with the payment card. User 102 may link to a payment card account in database 164 using payment card information (e.g., a payment card number, expiration date, name, and/or card identification value). Thus, when the card information is transmitted to payment card issuer server 160, e.g. from point of sale device 140, the payment card account may be found.

In various embodiments, payment card issuer server 160 includes at least one network interface component (NIC) 166 adapted to communicate with network 170 including communication device 110 and/or point of sale device 140. In various embodiments, network interface component 166 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 170 may be implemented as a single network or a combination of multiple networks. For example, in various embodiments, network 170 may include the Internet or one or more intranets, landline networks, wireless networks, and/or other appropriate types of networks. Thus, network 170 may correspond to small scale communication networks, such as a private or local area network, or a larger scale network, such as a wide area network or the Internet, accessible by the various components of system 100.

Figure 2:
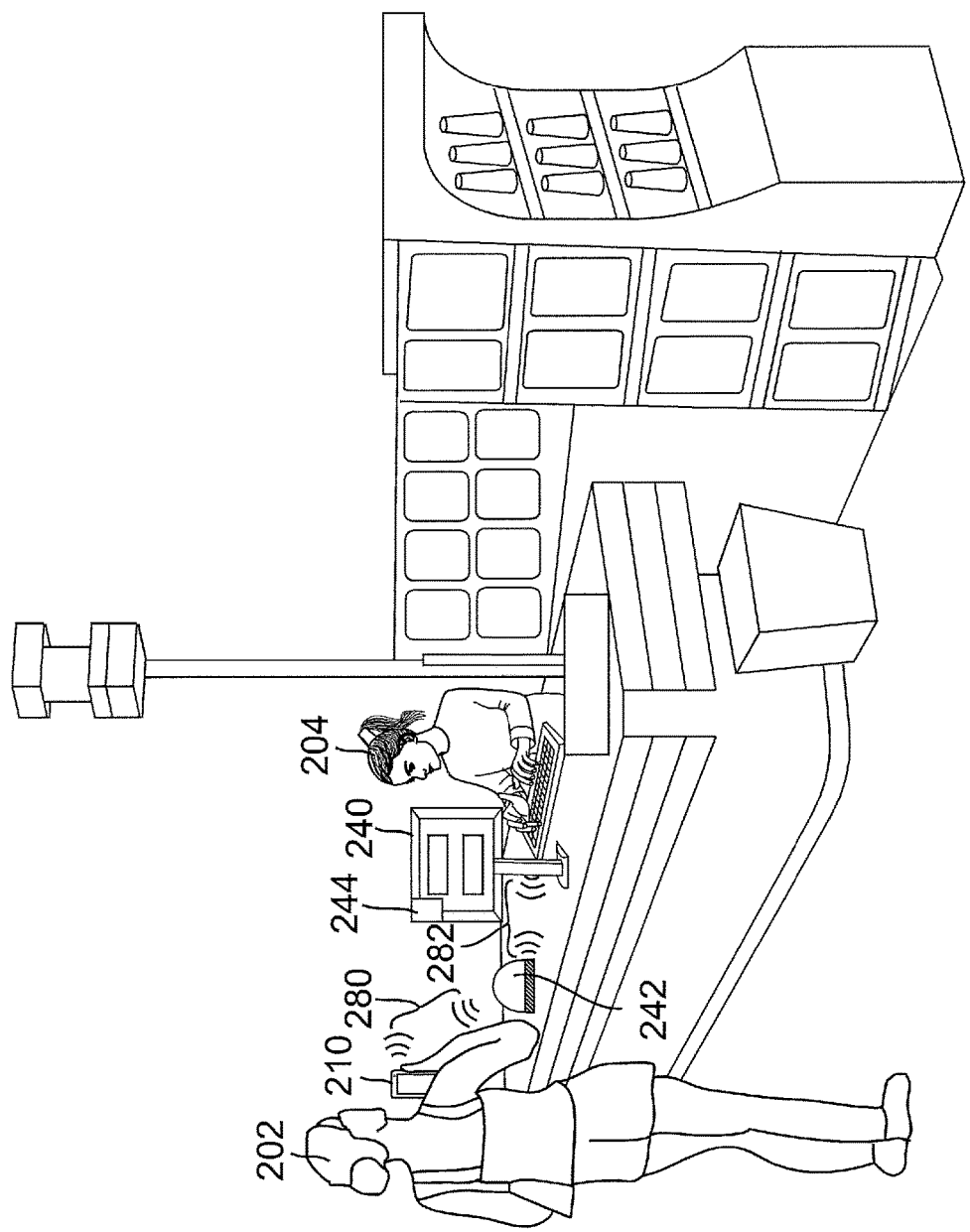
FIG. 2 is an exemplary merchant environment showing a payment token transmitted to a point of sale device using wireless beacon communications through a magnetic card reader connected to the point of sale device, according to an embodiment.

FIG. 2 is an exemplary merchant environment showing a payment token transmitted to a point of sale device using wireless beacon communications through a magnetic card reader connected to the point of sale device, according to an embodiment. Environment 200 of FIG. 2 includes a user 202, a communication device 210, a point of sale device 240, a wireless beacon 242, and an accessory 244 corresponding generally to user 102, communication device 110, point of sale device 140, wireless beacon 142, and accessory 144, respectively, of FIG. 1.

Environment 200 in FIG. 2 may correspond to a merchant location where user 202 may wish to purchase one or more items/services from a merchant salesperson 204. Thus, when located in environment 200, user 202 possesses communication device 210 that may connect with wireless beacon 242 when communication device 210 is in proximity to wireless beacon 242. In other embodiments, user 202 may effectuate a check-in with the merchant in environment 200 through a network connection of communication device 210. Once communication device 210 is checked-in with the merchant, user 202 may select items/services to purchase from merchant salesperson 204. Once user 202 is ready to complete a purchase of selected items/services, user 202 may utilize communication device 210 to review the purchase request and provide a payment token to point of sale device 240. In various embodiments, a payment provide may generate a payment token that may correspond to an alphanumeric code that may be utilized with stored payment information (e.g., a payment instrument) to effectuate payment to the merchant in environment 200.

Communication device 210 may connect with wireless beacon 242 as shown using a connection 280. Connection 280 may allow communication device 210 and wireless beacon 242 to exchange information. Thus, communication device 210 may transmit the payment token to wireless beacon 242 over connection 280. As discussed herein, the payment provider generating the token may encrypt the payment token to secure the payment token from unauthorized reception by a device receiving information transmitted in connection 280. In other embodiments, the payment token may be encrypted by communication device 110 or unencrypted in connection 280. Once the payment token is received by wireless beacon 242, the payment token may be decrypted by wireless beacon 242 and/or prepared for transaction to accessory 244.

Once wireless beacon 242 obtains the payment token after decryption, wireless beacon may transmit the payment token to accessory 244 using a magnetic field emission 282, which may include a magnetic field generator that converts relevant or appropriate payment card information into a magnetic field that is emitted from wireless beacon 242. Accessory 244 may correspond to a magnetic card reader that may receive data encoded to a magnetic card stripe under normal operations. However, using magnetic field emission 282, wireless beacon 242 may mimic the swipe of a magnetic card and transmit data to accessory 244 using magnetic field generation. Thus, the encrypted payment token may be communicated to accessory 244 using magnetic field emission 282. Once received by accessory 244, merchant salesperson 204 may then process and complete a sale using point of sale device 240, a payment provider, and/or a payment card issuer service, as discussed herein.

Figure 3:
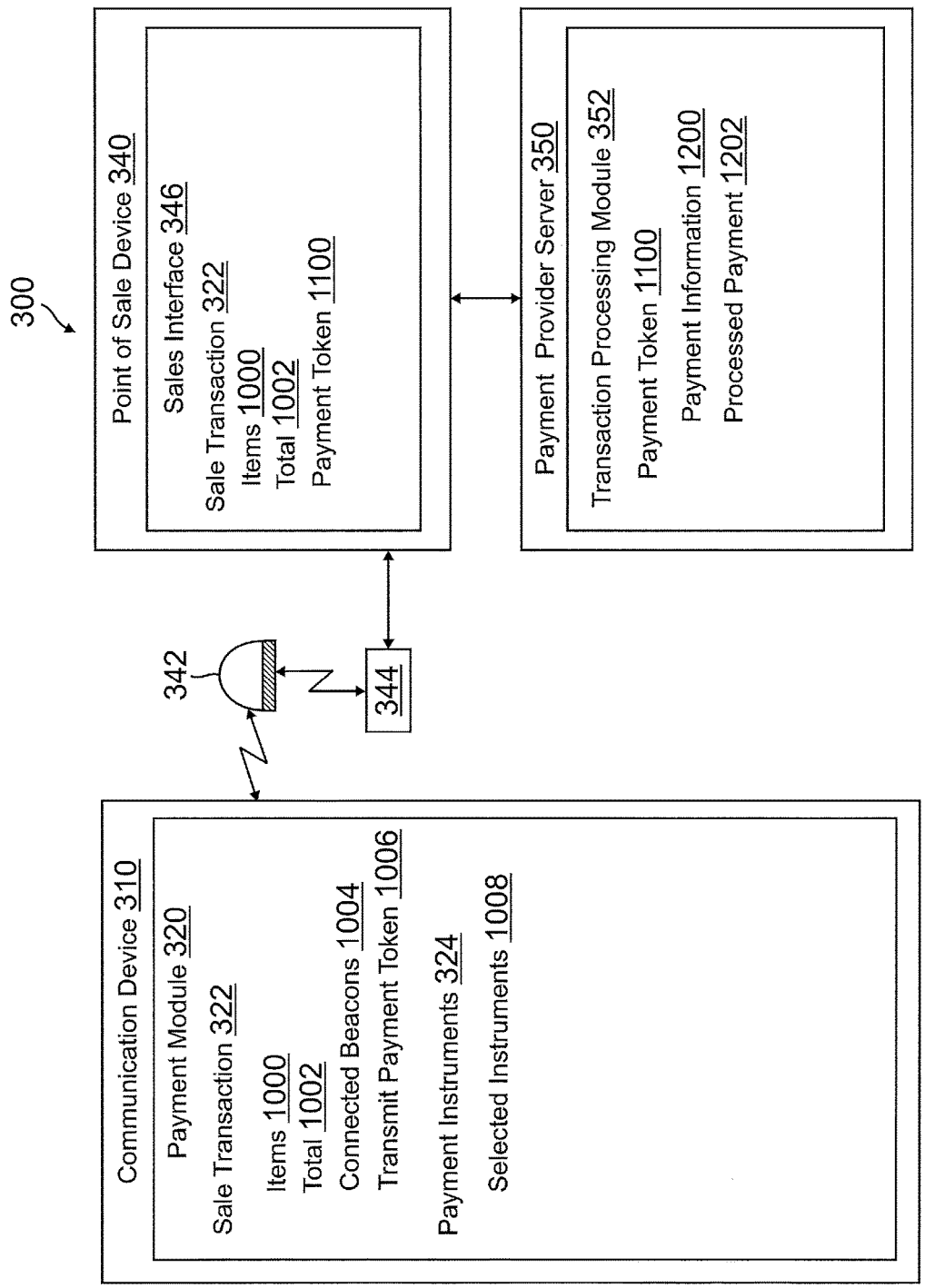
FIG. 3 is a system environment having an encrypted payment token communicated to a point of sale device for processing with a payment provider using a magnetic card reader, according to an embodiment.

FIG. 3 is a system environment having an encrypted payment token communicated to a point of sale device for processing with a payment provider using a magnetic card reader, according to an embodiment. Environment 300 includes a communication device 310, a point of sale device 340, a wireless beacon 342, an accessory 344, and a payment provider server 350 corresponding generally to communication device 110, point of sale device 140, wireless beacon 142, accessory 144, and payment provider server 150, respectively, of FIG. 1.

Communication device 310 executes a payment module 320 corresponding generally to the specialized hardware and/or software modules and processes described in reference to payment module 120 of FIG. 1. In this regard, payment module 320 may provide payment tokens to wireless beacon 342 for communication to accessory 344 connected to point of sale device 340. Payment module 320 includes a sale transaction 322 and payment instruments 324. Sale transaction 322 may include a payment request having one or more items/services that the user (not shown) of communication device 310 may wish to provide payment for using payment instruments 324. Thus, sale transaction 322 includes items 1000 and total 1002, which may include a display of selected items for purchase and a total cost of all items. Sale transactions 322 also includes connected beacons 1004 allowing the user to view the beacons to which communication device 310 may communicate a payment token. Payment instruments 324 include available payment instruments for the user and have a selected instrument 1008 for use in payment. Payment instruments 324 may be utilized by a payment provider server 350 after receiving a payment token from point of sale device 340 in order to effectuate payment to the merchant associated with point of sale device 340. Once the user is satisfied with items 1000, total 1002, and connected beacons 1004, the user may initiate transfer of a payment token having an alphanumeric code that may be utilized to identify the user and a payment instrument for the user by selecting the option to transmit payment token 1006.

Once the payment token is transmitted to wireless beacon 342 (potentially encrypted by one of communication device 310 and a payment provider generating the payment token), wireless beacon 342 may decrypt the payment token and communicate the payment token to accessory 344 using magnetic field modulation. Point of sale device 340 may then receive the payment token from accessory 344. Point of sale device 340 includes a sales interface 346, which may be utilized to complete sales transactions with customers. Sales interface 340 may display a sale transaction 322 correspond to sale transaction 322 in payment module 320. Thus, sale transaction 322 similarly includes item 1000 and total 1002. When receiving a payment token from accessory 344, sales interface 346 further includes payment token 1100.

As point of sale device 340 still requires the payment for sale transaction 322, point of sale device 340 may transmit payment token 1100 to payment provider server 350 for processing. Transaction processing module 352 of payment provider server 350 includes payment token 1100 using to identify the user of communication device 110 and/or a payment account for the user. Transaction processing module 352 may correspond generally to the specialized hardware and/or software modules and processes described in reference to transaction processing module 152 of FIG. 1. Transaction processing module 352 may process payment token 1102 to retrieve payment information 1200. When payment information includes a payment account managed by payment provider server 350, transaction processing module 352 may further complete payment to point of sale device 340 as processed payment 1202 for sale transaction 322. However, in other embodiments, payment information 1200 may include a payment card as the payment instrument, which may be sent back to point of sale device 340 to complete payment with the payment card's issuer service.

Figure 4:
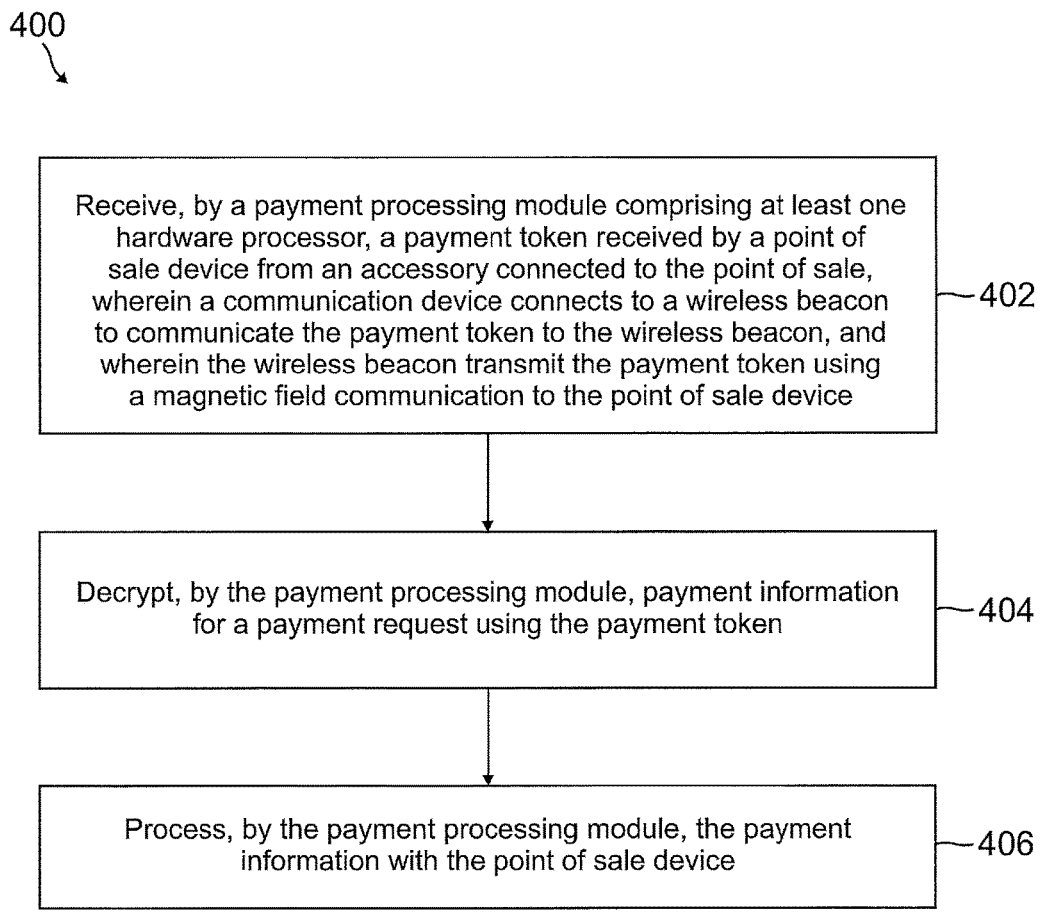
FIG. 4 is a flowchart of an exemplary process for wireless beacon communications through magnetic card readers, according to an embodiment.

FIG. 4 is a flowchart of an exemplary process by a server for receiving a payment token from a point of sale device, according to an embodiment. Note that one or more steps, processes, and methods described herein may be omitted, performed in a different sequence, or combined as desired or appropriate.

At step 402, a payment token received by a point of sale device from an accessory connected to the point of sale is received, by a transaction processing module comprising at least one hardware processor, wherein a communication device connects to a wireless beacon to communicate the payment token to the wireless beacon, and wherein the wireless beacon transmits the payment token using a magnetic field communication to the accessory connected to the point of sale device. The magnetic field communication may be range limited to prevent unauthorized transmission of the encrypted payment token. Thus, the point of sale device may comprise a magnetic card reader. Additionally, the beacon may connect with the communication device using one of near field communication, radio communication, infrared communication, Bluetooth communication, and Bluetooth low energy communication. The connection between the communication device and the wireless beacon may be formed when the communication device is within proximity of the wireless beacon. The proximity of the wireless beacon may comprise an area of a merchant location associated with the point of sale device. A payment provider may generate the payment token corresponding to an alphanumeric code that identifies a user and/or a payment instrument for the user. For example, the code may correspond to a 4-10 digit numerical identifier that allows the payment instrument to identify a user and a point of sale device engage in a transaction with the user. The payment token may be utilized to determine payment information and provide payment to a merchant.

The in various embodiments, the payment token may be encrypted using one of Advanced Encryption Standard (AES) encryption and Triple DES (TDES) encryption. The wireless beacon may decrypt the payment token prior to transmission to the accessory (e.g., the magnetic card reader). The payment token may be encrypted by either the communication device prior to transmission to the beacon, or by the beacon after receiving the payment token. The beacon may transmit a payment request to the communication device in order to receive the payment token, where the communication device retrieves the payment token after receiving the payment request.

At step 404, payment information for a payment request is determined using the payment token, by the transaction processing module. In various embodiments, the transaction processing module provides the payment for the payment request to the point of sale device by generating a one-time use payment card number associated with the payment account, and providing the one-time use payment card to the point of sale device for processing with a card issuer gateway to receive the payment. The payment information is processed with the point of sale device by the transaction processing module, at step 406. The processing of the payment information may comprise transmitting the payment information to the point of sale device for transmission to a payment card issuer for fulfillment. However, in other embodiments, the processing may comprise determining a payment account corresponding to the payment information, and processing the payment request using the payment account. In various embodiments, prior to the communication device retrieving payment token, the communication device may receive a payment request from one of the wireless beacon and the point of sale device, where the payment information comprises payment for the payment request.

Figure 5:
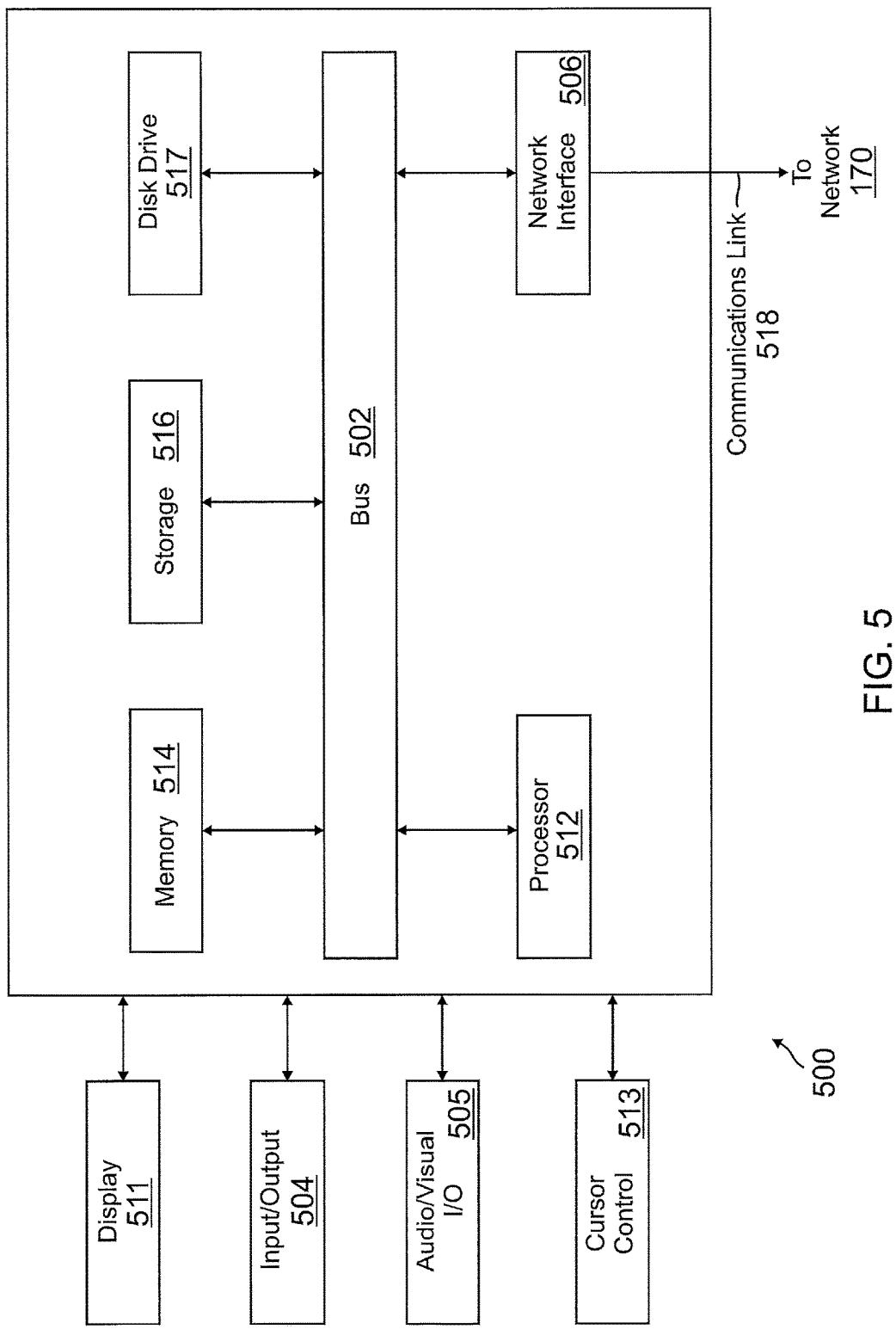
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 170. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory; and
one or more hardware processors coupled to the non-transitory memory and configured to read instructions from the non-transitory memory to cause the system to perform operations comprising:
receiving check-in information from a connection between a communication device and a wireless beacon associated with a point of sale device comprising a magnetic card reader;
in response to the receiving, receiving, from the communication device, a request for a transaction generating an alphanumeric identifier associated with the point of sale device based on the request;
communicating the alphanumeric identifier to the communication device;
receiving, from the point of sale device, a payment token comprising the alphanumeric identifier and a code sequence emulating magnetic card data for a payment card that is transmitted to the point of sale device through the magnetic card reader by the wireless beacon through a magnetic field communication, wherein the code sequence generated by the wireless beacon from a pre-established account token is received from the communication device with the alphanumeric identifier;
determining payment information for an account associated with the pre-established account token using the payment token; and
processing the payment information with the point of sale device.

2. The system of claim 1, wherein the magnetic field communication is range limited to a set proximity range selected to prevent unauthorized transmission of the payment token.

3. The system of claim 1, wherein the connection uses one of near field communication, radio communication, infrared communication, Bluetooth communication, Bluetooth Low Energy (BLE) communication, LTE Direct communication, or WiFi communication.

4. The system of claim 1, wherein the processing the payment information comprises transmitting the payment information to the point of sale device for transmission to a payment card issuer.

5. The system of claim 1, wherein the request to generate the alphanumeric identifier further comprises a payment request for a transaction, and wherein the processing the payment information comprises determining a payment account corresponding to the payment information and providing payment for the payment request to the point of sale device using the payment account.

6. The system of claim 5, wherein the providing the payment for the payment request to the point of sale device comprises generating a one-time use payment card number associated with the payment account and providing the one-time use payment card number to the point of sale device for processing with a card issuer gateway to receive the payment.

7. The system of claim 1, wherein the payment token comprises an encrypted payment token, and wherein the encrypted payment token is communicated to the wireless beacon by the communication device.

8. The system of claim 7, wherein encrypted payment token is decrypted prior to transmission to the magnetic card reader.

9. The system of claim 1, wherein the request to generate the alphanumeric identifier further comprises a payment request, and wherein the payment request is for a transaction with a merchant associated with the point of sale device.

10. The system of claim 1, wherein a payment request is transmitted to the communication device, and wherein the request to generate the alphanumeric identifier is received in response to the receiving the payment request.

11. The system of claim 1, wherein the request to generate the alphanumeric identifier further comprises a payment request for a transaction, and wherein the payment information comprises payment for the payment request.

12. The system of claim 1, wherein the communication device and the wireless beacon are connected when the communication device is within proximity of the wireless beacon.

13. The system of claim 12, wherein the proximity of the wireless beacon comprises an area of a merchant location associated with the point of sale device.

14. A method comprising:
receiving check-in information from a connection between a communication device and a wireless beacon associated with a point of sale device comprising a magnetic card reader;
in response to the receiving, receiving, from the communication device, a request for a transaction;
generating an alphanumeric identifier associated with the point of sale device based on the request;
communicating the alphanumeric identifier to the communication device;
receiving, from the point of sale device, a payment token comprising the alphanumeric identifier and a code sequence emulating magnetic card data for a payment card that is transmitted to the point of sale device through the magnetic card reader by the wireless beacon through a magnetic field communication, wherein the code sequence generated from a pre-established account token is received from the communication device with the alphanumeric identifier;
determining payment information for an account associated with the pre-established account token using the payment token; and
processing the payment information with the point of sale device.

15. The method of claim 14, wherein the payment token is encrypted, and wherein the encrypted payment token is communicated to the wireless beacon by the communication device.

16. The method of claim 14, wherein the encrypted payment token is decrypted prior to, transmission to the magnetic card reader.

17. The method of claim 14, wherein the connection uses one of near field communication, radio communication, infrared communication, Bluetooth communication, Bluetooth Low Energy (BLE) communication, LTE Direct communication, or WiFi communication.

18. A non-transitory machine readable medium having stored thereon machine-readable instructions executable to cause a machine to perform operations comprising:
receiving check-in information from a connection between a communication device and a wireless beacon associated with a point of sale device comprising a magnetic card reader;
in response to the receiving, receiving, from the communication device, a request for a transaction;
generating an alphanumeric identifier associated the point of sale device based on the request;
communicating the alphanumeric identifier to the communication device;
receiving, from the point of sale device, a payment token comprising the alphanumeric identifier and a code sequence emulating magnetic card data for a payment card that is transmitted to the point of sale device through the magnetic card reader by the wireless beacon through a magnetic field communication, wherein the code sequence generated from a pre-established account token is received from the communication device with the alphanumeric identifier;
determining payment information for an account associated with the pre-established account token using the payment token; and
processing the payment information with the point of sale device.

19. The system of claim 1, wherein the alphanumeric identifier comprises a time-variable mapping between the communication device for a user and the point of sale device for a merchant.

20. The method of claim 14, wherein the alphanumeric identifier comprises a time-variable mapping between the communication device for a user and the point of sale device for a merchant.

* * * * *

UNITED STATES PATENT AND TRADEMARK OFFICE
CERTIFICATE OF CORRECTION

PATENT NO. : 10,134,032 B2
APPLICATION NO. : 14/586906
DATED : November 20, 2018
INVENTOR(S) : Satish Govindarajan and Geoffrey W. Chatterton Page 1 of 1

It is certified that error appears in the above-identified patent and that said Letters Patent is hereby corrected as shown below:

In the Claims

In Column 21, Line 38, remove ",".
In Column 22, Line 4, add "-".

Signed and Sealed this
Twenty-third Day of July, 2019

Andrei Iancu
*Director of the United States Patent and Trademark Office*